United States Patent
Baird

(10) Patent No.: US 7,430,979 B2
(45) Date of Patent: Oct. 7, 2008

(54) METHOD OF TRANSPORTING AN ELONGATE MEMBER

(75) Inventor: Hamish Bissett Baird, Aberdeen (GB)

(73) Assignee: Subsea 7 BV (NL)

( * ) Notice: Subject to any disclaimer, the term of this patent is extended or adjusted under 35 U.S.C. 154(b) by 0 days.

(21) Appl. No.: 11/439,454

(22) Filed: May 23, 2006

(65) Prior Publication Data

US 2006/0283369 A1      Dec. 21, 2006

(30) Foreign Application Priority Data

May 24, 2005    (GB) ................. 0510536.6

(51) Int. Cl.
*B63G 8/14*     (2006.01)
*F16L 1/00*     (2006.01)

(52) U.S. Cl. ..................... 114/245; 405/158

(58) Field of Classification Search ............ 114/245
See application file for complete search history.

(56) References Cited

U.S. PATENT DOCUMENTS 4,075,862 A    2/1978    Ames

FOREIGN PATENT DOCUMENTS

| EP | 1022501 A1 * | 7/2000 |
|---|---|---|
| GB | 2114700 A | 8/1983 |
| GB | 2153318 A | 8/1985 |

* cited by examiner

*Primary Examiner*—Jesús D Sotelo
(74) *Attorney, Agent, or Firm*—Drinker Biddle & Reath LLP

(57) ABSTRACT

The present invention provides a method for transporting an elongate member through water. The elongate member has a first end portion and a second end portion. The method comprises the steps of: adjusting the buoyancy of the elongate member to ensure that the elongate member is buoyant; providing at least one weight acting on each end portion of the elongate member; and transporting the elongate member through water in an inverted catenary configuration. The elongate member can be transported below the wave affected zone. The or each weight acting on each end portion of the elongate member can be detachably connected thereto. The elongate member can be transported by towing.

17 Claims, 3 Drawing Sheets

METHOD OF TRANSPORTING AN ELONGATE MEMBER

BACKGROUND OF THE INVENTION

The present invention provides a method for transporting elongate members. In particular, the method of the present invention is especially suited to transporting oil industry equipment such as risers or riser towers through water.

Equipment such as risers and riser towers are typically used in the oil and gas industry for deep water applications and consequently may be over one kilometre long and can require transportation to offshore locations, before subsea installation.

One method of transportation includes providing the equipment in sections, transporting the sections on board a vessel to the region in which they are to be deployed, assembling the sections on board a specially built vessel and deploying the equipment to the required location. Assembling the equipment offshore in this way can be very time consuming and consequently very expensive, and it is also subject to the constraints and hazards of ship borne assembly and test.

An alternative method is to assemble the equipment onshore and use suitable vessels to tow the assembled equipment through the sea to the relevant location. Since the assembled equipment can be checked and verified onshore, towing the preassembled equipment potentially offers a quicker, less hazardous, and less expensive method than assembly on board a vessel. However, towing through the sea at or near the surface results in constant flexing and fatigue of the equipment throughout the tow due to wave action. This results in a reduction in the usable fatigue life of the equipment following installation.

The fatigue problem can be alleviated by towing the equipment at a depth below the wave-affected zone. The equipment can be made to be substantially neutrally buoyant and towed at the required depth through the addition of buoyancy and/or chains suitably spaced along its length. Before installation of the towed equipment, it is recovered to the surface to allow the attached buoyancy and/or chains to be removed. This can be time consuming, costly, and vulnerable to adverse weather conditions. Furthermore, during removal there is a risk that the attachments could fall and damage subsea equipment already in place.

BRIEF DESCRIPTION OF THE INVENTION

According to a first aspect of the present invention, there is provided a method for transporting an elongate member through water, the member having a first end portion and a second end portion, the method comprising the steps of:

adjusting the buoyancy of the elongate member to ensure that the elongate member is buoyant;

providing at least one weight acting on each end portion of the elongate member; and transporting the elongate member through the water in an inverted catenary configuration.

The depth at which the elongate member is transported can be adjusted by altering at least one of: the mass of the attached weights; the length of the tow lines; the buoyancy of the elongate member; and the tension applied to it by the towing vessels. Preferably, the method also includes the step of transporting the elongate member at least partially, but ideally wholly, below the wave-affected zone.

"Catenary configuration" as used herein is intended to refer to the curve assumed by a substantially uniform flexible member hanging freely from two points. Accordingly, the elongate member adopts an inverted catenary configuration when immersed in water due to its positive buoyancy lifting the mid-portion between the weighted end portions, which adopt a lower position in the water due to the weights acting thereon. The positive buoyancy of the elongate member means that it adopts a hogged rather than a sagged position in water. Thus the method allows the elongate member to be transported below the wave-affected zone in a predictable manner. Further, the fatigue performance can be improved by transporting below the wave-affected zone in this stable inverted catenary configuration. This is because the flexing of the equipment due to wave action during the tow is substantially reduced, and thus the effects of fatigue are substantially reduced and the usable life of the equipment at the installation site is substantially increased.

Preferably, the weights acting on the end portions of the elongate member are detachably connected thereto. Selectively detachable weights are advantageous since they allow removal of the weights without significant interference with the elongate member as they are substantially independent of it.

The weights can be provided on rigging detachably connected to the end portions of the elongate member. Provision of the weights on the rigging represents an advantage since they can be easily removed before installation of the elongate member simply by disconnecting the ties between the weights and the elongate member. This has the advantage of minimising interference with the elongate member during installation, and avoiding the need to attach separate safety lines to the weights before detaching them from the towed assembly. Thus on arrival in the field, the upending operation can commence immediately, thereby minimising the time between transportation and installation. Moreover, the elongate member is not required to be retrieved to the surface of the water as a pre-requisite to installation on site.

The method can also include the step of transporting the elongate member by towing. The elongate member can be towed by coupling the first end portion of the elongate member to a tow vessel via a towline.

The method can further include the step of applying a back tension to the second end portion of the elongate member during transportation. This can be achieved by coupling the second end portion of the elongate member to a vessel via a towline.

The depth at which the elongate member is transported can also be varied by adjusting the tension and/or the length of the at least one towline.

The method can include attaching at least one weight to act on each end portion of the elongate member. Use of independently suspended weights to act on and weigh down the end portions represents an advantage over the use of chains suspended at intervals along the length of the elongate member.

The weights can be clump weights. Clump weights acting on the end portions of the elongate member perform their function without incurring additional problems during transportation, such as variable hydrodynamic lift associated with the use of chains distributed along the elongate member; hydrodynamic lift can occur in such systems and varies in accordance with the transport speed, thereby resulting in a reduction in the effective mass acting on the elongate member, an effect that can limit the allowable towing speed. Alternatively, any type of weight may be used providing it acts on the end portions and therefore is capable of causing the elongate member to hog rather than sag. The weights may be detachably connected to the end portions of the elongate member by provision of detachable connector means between the weight and the elongate member.

The method can further include damping of the effects of the motion of the tow vessel. Damping of the vessel motion has the advantage that problems caused by stress, fatigue, and bending moments imposed by the vessel motion onto the elongate member are alleviated. The damping effect can be achieved by attaching at least one weight between the vessel and the or each end portion. The towline can be detachably coupled to the connector means, which connect the end portions of the elongate member and the weights acting thereon. Oscillation of the vessel on the surface of the water causes oscillation of the at least one weight by virtue of the coupling arrangement between the vessel and the at least one weight. Thus vessel motion preferentially moves the weight rather than the elongate member, and the rigging thus isolates the movement of the vessel and the weight from the elongate member.

The weight has an inertial resistance to movement in the water, and acts as a damper due to its mass and also due to the hydrodynamic drag effect of the weight as it moves through the surrounding water. The resultant energy dissipation by the movement of the weight significantly reduces the amplitude of oscillation of the weight compared with the amplitude of oscillation of the vessel. This arrangement therefore effectively isolates the vessel movement from the elongate member. Accordingly, any concentration of a relatively large mass provided on the rigging between the vessel and the elongate member can be used to act as a damper.

The weight can be shaped to modify the damping effect. For example, the weight can have a large surface area exposed in the direction of travel of the weight through the water. Thus, the drag effect of the surrounding sea on the weight can be increased, enabling improved control over the movement of the weight.

Standard heavy weight towlines can be used, since the motion of the vessel is damped, for example, by the addition of at least one weight to the rigging. The method of transportation according to this invention, enables use of heavy-duty towlines and thus minimises the occurrence of towline failure.

The buoyancy can be adjusted by filling bores of the elongate member with buoyant material. Pipes that make up the elongate member can be filled with buoyant material. The buoyant material can be any suitable gas such as air. Typically a bore in the elongate member can be closed off to form a cavity to accept the buoyant material, for example, by sealing the ends of the pipe(s) to trap air within the bore(s) before launching the member into the water.

Alternatively or additionally, the buoyancy can be adjusted by covering at least a portion of an outer surface of the elongate member with buoyant material.

The method can include insulating the elongate member using a cladding material. This cladding material may also be a buoyant material, thereby serving a dual purpose. The cladding material can be attached by clamping means or adhesive bonding.

Additional buoyancy can be provided to act on the elongate member. The additional buoyancy can be deployed at the water surface. This buoyancy can be attached to the connector means, such that in the event of towline breakage, the buoyancy floats and suspends the towed assembly comprising the elongate member, the weights acting thereon and the connector means beneath the surface of the water. By floating on the surface and suspending the towed assembly, the buoyancy is configured so that it can prevent the coupled elongate member from sinking, whilst keeping it below the wave-affected zone.

Once the elongate member has been transported using the method according to the invention, it can be parked, with the tow lines still attached, and suspended from the surface by the buoyancy. It remains submerged below the wave-affected zone and in a condition of controlled tension.

According to another aspect of the invention, there is provided a method of towing an elongate member through water, the elongate member having two end portions, the method comprising the steps of:

providing a towline, a vessel and at least one weight;

attaching the towline to the vessel;

coupling one of the end portions of the elongate member to the towline;

attaching at least one weight to the towline acting between the vessel and the end portion;

submerging the elongate member in water;

moving the vessels and towing the elongate member through water; and damping the movement of the vessel from the end portion of the elongate member by ensuring that the elongate member has a greater buoyancy than the at least one weight.

A second vessel and towline can be provided and the method can include attaching the second vessel to the other end portion of the elongate member and applying a back tension to the elongate member during towing. The method can further include attaching at least one weight to the towline acting between the second vessel and the end portion and damping movement of the second vessel from the elongate member.

The term "elongate member" is intended to include (without limitation) pipes, risers, riser towers, hoses, umbilicals, pipes-in-pipes and the like. These can be contained within one another, transported separately or in a bundle. The assembly can be several kilometres long depending on the water depth at the installation site.

BRIEF DESCRIPTION OF SEVERAL VIEWS OF THE DRAWINGS

One embodiment of the present invention will now be described with reference to and as shown in the following drawings in which.

DETAILED DESCRIPTION of the INVENTION

Figure 1:
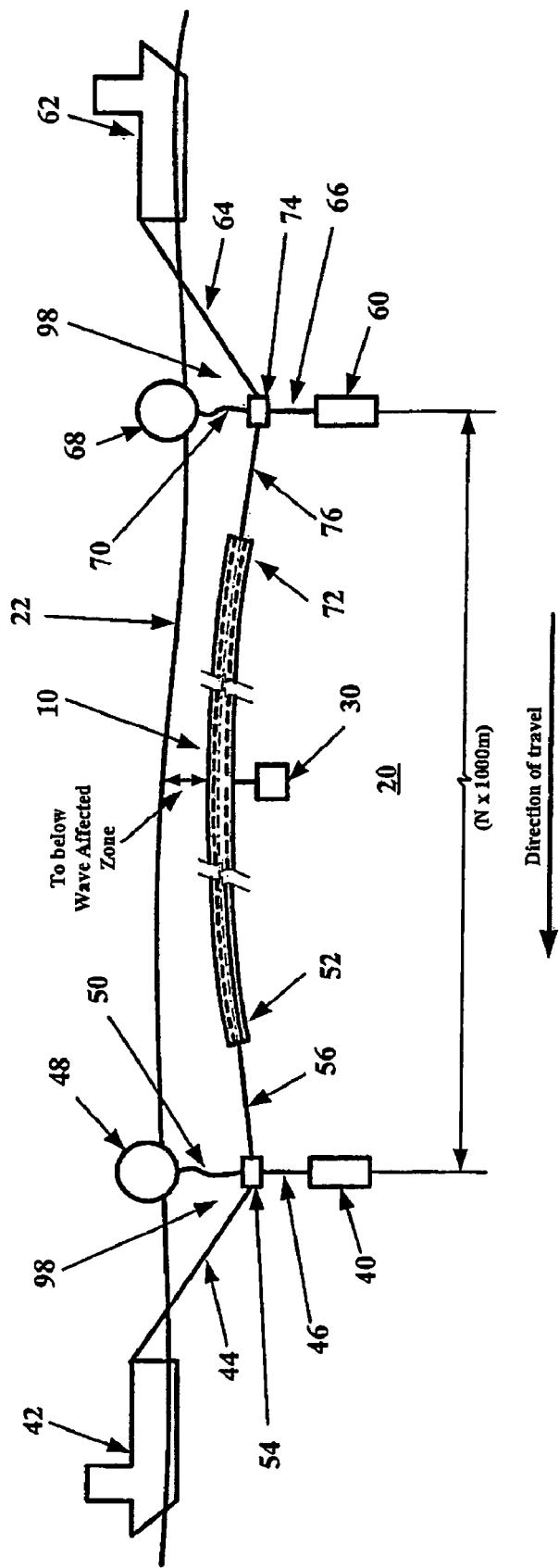
FIG. 1 is a sectional schematic of a method of towing a riser in accordance with the present invention.
Figure 2:
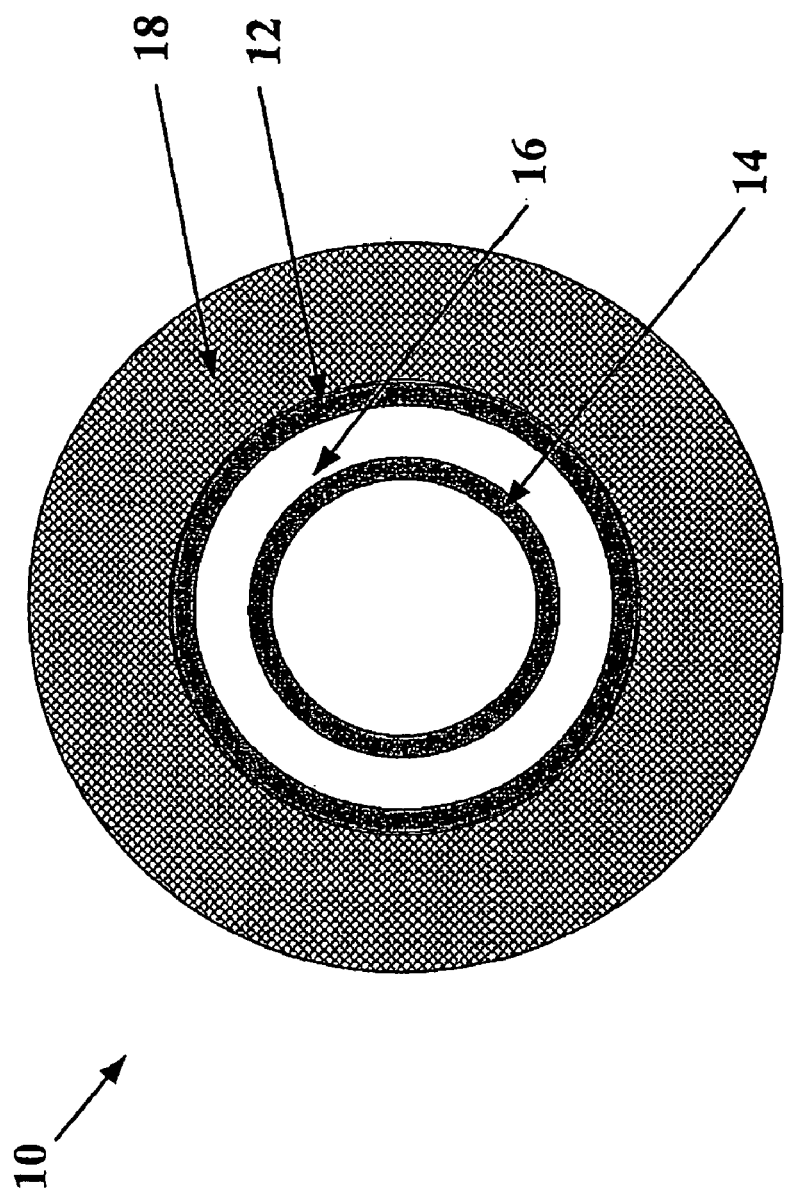
FIG. 2 is a sectional view of a pipe-in-pipe riser or riser tower.

In the present embodiment, the elongate member is a riser assembly shown generally at 10 in FIG. 1. In this embodiment, the riser assembly 10 is in the form of a pipe-in-pipe configuration as shown in FIG. 2. The riser assembly 10 comprises an inner pipe 14 and an outer pipe 12. The inner pipe 14 is housed within and is coaxial with the outer pipe 12. An annular space 16 between the inner pipe 14 and outer pipe 12 is typically filled with air. The bore of the inner pipe 14 is also typically air-filled.

The outer pipe 12 is surrounded by a layer of buoyant material 18. In this embodiment, the buoyant material 18 is provided in the form of two half-shells, which are clamped around the outer pipe 12. The thickness of the buoyant material 18 can be varied depending on factors such as the installed depth and mass of the riser assembly 10 to be towed, the specific gravity of the buoyant material 18, the insulation properties needed to meet the flow assurance requirements, and the maximum crush resistance required at any given point along the length of the riser during/following installation.

The air-filled bore, annular space 16 and buoyant material 18 all contribute to making the riser assembly 10 positively self-buoyant in water 20. This reduces the risk of losing the riser assembly 10, for example, by sinking to the sea bed in the event of equipment failure or damage.

The riser assembly 10 has a first end portion 52 and a second end portion 72. The first end portion 52 of the riser assembly 10 is attached to a connector 54 by a pennant 56. A weight 40 is suspended beneath the connector 54, by an attachment means 46 attached between the weight 40 and the connector 54. A buoyant member 48 is also attached to the connector 54 via attachment means 50. A towline 44 is attached to the connector 54 at one end and a lead tow vessel 42 at the other.

Similarly, the second end portion 72 of the riser assembly 10 is attached via a pennant 76 to a connector 74. The connector 74 also supports a weight 60. The weight 60 is attached to the connector 74 by an attachment means 66. A buoyant member 68 is attached to the connector 74 by attachment means 70. The connector 74 is coupled to a trailing tow vessel 62 via a towline 64.

In normal use the towlines 44, 64 between the lead and trailing tow vessels 42, 62 and the connectors 54, 74 are taut, as are the pennants 56, 76 between the connectors 54, 74 and the elongate member. The attachment means 50, 70 attaching buoyant members 48, 68 to the connectors 54, 74 are typically slack so that the balance of the buoyancy in the towed assembly is not affected during towing.

Because of the positively buoyant riser assembly 10 with weights 40, 60 attached via the connectors 54, 74 at each end portion 52, 72, the elongate member automatically hogs and adopts an inverted catenary configuration when suspended in the water 20. Typically, a catenary configuration describes a substantially uniform, flexible, substantially inextensible member suspended freely from two points.

Optionally, but not generally, a weight 30 may be attached in a central region of the riser assembly 10.

Before transportation, the riser assembly 10 is made up from lengths of steel pipe sections welded together and quality checked onshore. If required, the external buoyant material 18, shown in FIG. 2 can be incorporated within or otherwise applied to the pipe sections at this stage. On completion, the riser assembly 10 is launched into the water 20 for transportation by towing to the desired location.

During transportation, the riser assembly 10 is suspended between the lead and trailing vessels 42, 62 via towlines 44, 64 and pennants 56, 76 which can be collectively referred to as rigging 98. Weights 40, 60 are integrated into the rigging 98 at each end 52, 72 such that the entire riser assembly 10 is made to sink below the wave affected zone. Since the riser assembly 10 itself is specifically designed to be buoyant, when fully submerged in the water 20, the riser assembly 10 occupies a hogged position with the buoyant central portion rising above the weighted end portions 52, 72. The hogged position is a substantially uniform slightly arched configuration, herein referred to as an inverted catenary configuration.

The lead tow vessel 42 tows the riser assembly 10 through the water 20 to the desired location. The trailing tow vessel 62 optionally provides a back tension to the riser assembly 10. This tow configuration is very stable since the riser assembly 10 is self-supporting and in a state of controlled tension. This stability is substantially independent of the towing speed. The application of back tension also means that the riser assembly 10 is less susceptible to bending moments.

During the tow, the upper part of the riser assembly 10 is typically around 20 metres below the surface 22 of the water 20 and the first end 52 and second end 72 are typically around 50 metres below the surface 22 of the water 20. The mass of weights 40, 60, 30 can be varied according to the length and/or buoyancy of the riser assembly 10 and the distance beneath the surface 22 of the water 20 at which the riser assembly 10 is required to be transported. Towing beneath the wave-affected zone greatly reduces the flexing of the elongate member, and thus improves the usable fatigue life of the riser.

Weights 40, 60 can be clump weights. Use of clump weights avoids the hydrodynamic lift problems previously mentioned and associated with the attachment of chains to the elongate member 10. This enables the lead and trailing tow vessels 42, 62 to reach higher speeds than those possible using conventional submerged transportation methods. Furthermore, the inverted catenary configuration of the riser assembly 10 means that it behaves in a predictable manner while being towed and remains relatively stable during transportation.

As each vessel 42, 62 travels through the sea 20, it is affected by wave action. Wave peaks and troughs on the surface 22 of the sea 20 cause each vessel 42, 62 to oscillate. Oscillation of the vessels 42, 62 causes oscillation of the weights 40, 60; the motion being transferred by the towline 44, 64 coupling each vessel 42, 62 to the respective weight 40, 60. As a result of the direct connection between each vessel 42, 62 and respective weight 40, 60, the vessel 42, 62 motion is preferentially transmitted to the weights 40, 60 rather than to the riser assembly 10. Additionally, the amplitude of oscillation of each weight 40, 60 is greatly reduced compared with the amplitude of vessel 42, 62 oscillation as a result of the energy dissipation associated with the drag effect on the towline 44, 64 and the weight 40, 60 through the sea 20, as well as the inertial effect of each weight 40, 60. Consequently, the amplitude of oscillation of the weight 40, 60 is sufficiently reduced such that movement of each pennant 56, 76 coupling each weight 40, 60 and the riser assembly 10 dissipates sufficient energy to effectively isolate the riser assembly 10 from the vessel 42, 62 motion. Thus, the degree of the damping effect should be sufficient such that the riser assembly 10 is substantially unaffected by the oscillatory motion of each vessel 42, 62.

The effect described above can be optimised by shaping the weight 40, 60 such that a large surface area is exposed in the direction of travel. One suitable shape is an oblong weight having a relatively small thickness, with the faces having the greatest surface area exposed in the direction of travel.

Also, an additional damping effect is provided by the "V" shaped configuration of the rigging 98 created by the towlines 44, 64 and the pennants 56, 76, with the weights 40, 60 being attached at the "apex" of the V. For example, as the lead vessel 42 is lifted by wave action, or is pushed ahead of the riser assembly 10, the angle of the "V" increases as the towline 44 and the pennant 56 approach a straight line. The vessel 42 movement is accommodated by the upward movement of the weight 40 in the water 20 and the flattening of the V, and the movement and accompanying stress is thereby isolated from the riser assembly 10. Likewise, when the wave action drops the vessel 42 or pushes it back towards the riser assembly 10, the angle of the V becomes more acute, and the weight 40 drops in the water 20, thereby accommodating the movement of the vessel 42 without transferring the movement and stress to the riser assembly 10. The rear towline 64 and pennant 76 behave in a similar manner.

Should either of the towlines 44, 64, or pennants 56, 76 break during transportation, the attachment means 50, 70 will become taut as the towed assembly sinks and the buoyant members 48, 68 counter the gravitational pull of the weights 40, 60, 30 and riser assembly 10. Accordingly, the buoyant members 48, 68 remain at the surface 22 of the water 20 and hold the full weight of the weights 40, 60 and riser assembly 10 along with any additional attached weights 30 via the now taut attachment means 50, 70. Before it is deployed to the relevant location, the riser assembly 10 can also be parked in this submerged position while suspended from the surface 22 of the water 20 by buoyant members 48, 68. In this parked position, the riser assembly 10 is still attached to the tow vessels 42, 62 by the rigging 98.

The riser end portions 52, 72 and the attached rigging 98 remain relatively deep, typically 50 m below the surface of the sea in the parked position and therefore positioned below the wave affected zone. Consequently, an ROV can be used for the removal/adjustment of the rigging 98, and weights 40, 60, for example, during the installation process.

Figure 3:
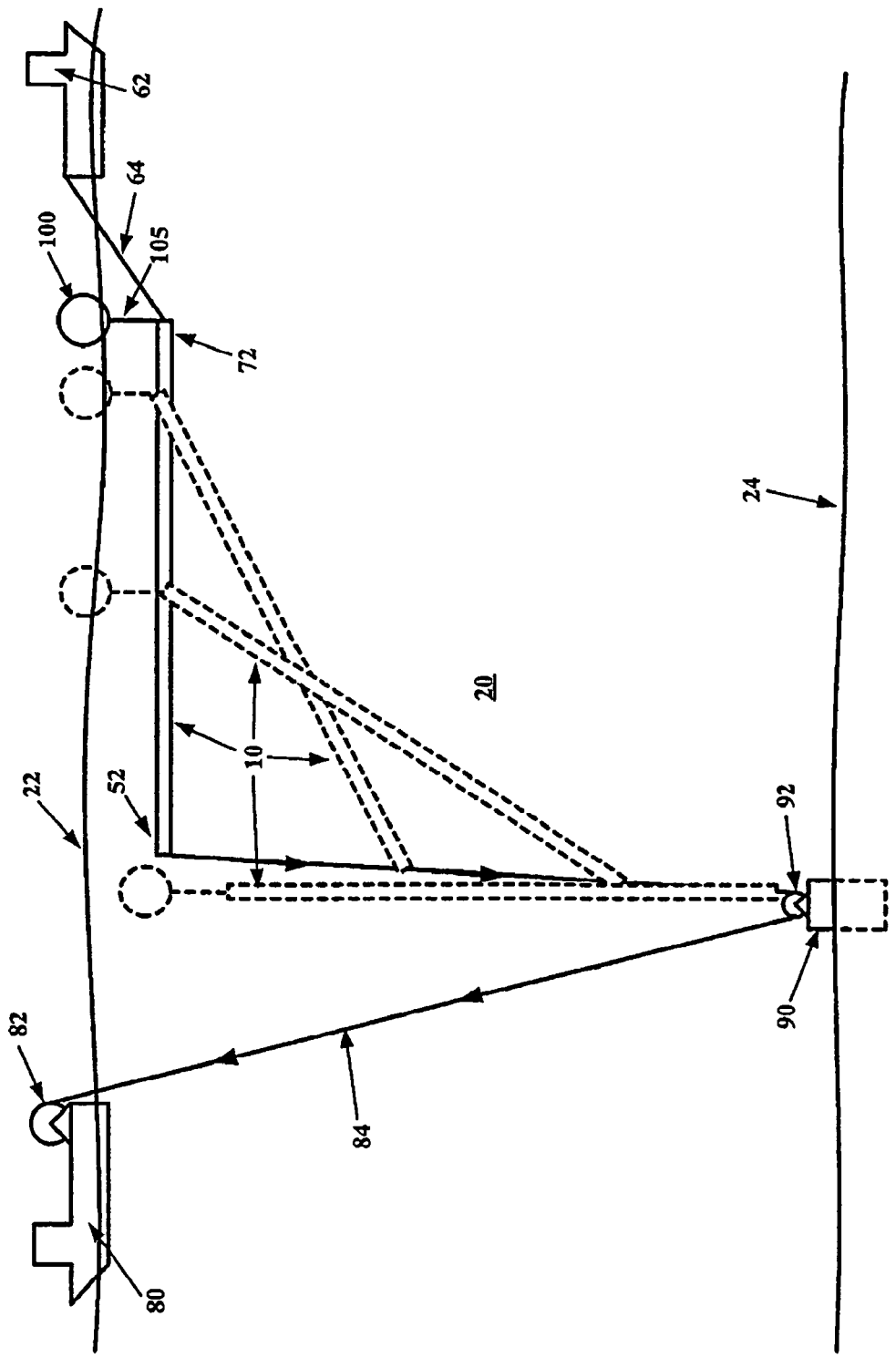
FIG. 3 is a sectional schematic of the riser of FIG. 1 being installed on the seabed.

FIG. 3 shows a typical method of riser assembly 10 installation. Before the installation procedure begins, any additional weights 30 are removed. This step is generally not required as weights 30 are not typically added along the length of the riser assembly 10.

Installation of the riser assembly 10 is achieved by first attaching an installation buoy 100 suitable for immersion, to the second end portion 72, via a pennant 105. This is followed by reconfiguring the towline 64 to connect the second end portion 72 to the tow vessel 62 and detaching the trailing end rigging 98 and the buoyant member 68.

A suction anchor 90 is typically positioned on the seabed 24. The suction anchor 90 has an attached pull down sheave 92. A pull down wire 84 is connected to the first end 52 of the riser assembly 10. At its other end, the pull down wire 84 is connected to a pull down winch 82. The wire 84 passes through the pull down sheave 92. The pull down winch 82 is provided on board an installation vessel 80.

The lead end rigging 98 and buoyant member 48 is then detached from the first end portion 52. The first end portion 52 can then be pulled towards the seabed 24 using the wire 84 through the sheave 92. The dashed outline of the riser assembly 10, the attachment means 105 and the installation buoy 100 show the riser assembly 10 at various stages of installation.

In the last stage, the installation buoy 100 is immersed as the riser end 52 is pulled down to the anchor 90. This ensures that the riser or riser tower is under tension and so remains substantially vertical.

A permanent subsea buoy (not shown) is then attached to the second end portion 72 by the installation vessel 80. The riser end portions 52 and 72 are then connected to the subsea pipeline, and the surface facility respectively, by suitable connection means (not shown).

Following attachment of the first end 52 to the suction anchor 90, the wire 84 can be disconnected. The suction anchor 90 provides an anchorage for the riser assembly 10 and ultimately a connection to an existing pipeline.

It will be appreciated by a person skilled in the art that any type of flexible connection can be used to connect the first end 52 of the riser 10 with the winch 82 on the installation vessel 80 providing that it is sufficiently strong for the purpose.

It will be also appreciated by a person skilled in the art that the anchor 90 can be of any type suited to the purpose.

The buoyant material 18 of the riser assembly 10 has a dual purpose. Buoyant material 18 also provides the insulation required to ensure that the produced oil remains at a temperature suitable for flow through the riser in use.

Modifications and improvements can be made without departing from the scope of the invention. For example, the density, type or quantity of buoyant material disposed along the length of the elongate member can be modified so that different amounts or types of buoyancy are attached at different locations along the length of the elongate member. For example, the buoyancy fixed at the first end portion 52 of the riser 10 that is located at a greater depth in use can be denser than the buoyancy at the second end portion 72, which helps to deploy the elongate member from the surface.

The invention claimed is:

1. A method for transporting an elongate member through water, the elongate member having a first end portion and a second end portion, the method comprising the steps of:
    adjusting the buoyancy of the elongate member by at least one method step selected from the group consisting of: filling and retaining a buoyant material within the elongate member; filling and retaining a buoyant fluid within the elongate member; and covering at least a portion of an outer surface of the elongate member with a buoyant material, thereby ensuring that the elongate member is positively buoyant;
    providing at least one weight acting on each end portion of the elongate member; and
    transporting the elongate member through water in an inverted catenary configuration.

2. A method according to claim 1, wherein the water includes a wave affected zone, and the method includes the step of transporting the elongate member below the wave affected zone.

3. A method according to claim 1, including detachably connecting the at least one weight acting on each end portion of the elongate member.

4. A method according to claim 1, including the step of transporting the elongate member by towing.

5. A method according to claim 1, including attaching the first end portion of the elongate member to a tow vessel via a towline.

6. A method according to claim 1, including applying a back tension to the second end portion of the elongate member during transportation of the elongate member.

7. A method according to claim 1, including attaching the second end portion of the elongate member to a second tow vessel via a second towline.

8. A method according to claim 1, including attaching at least one weight in the region of each end portion of the elongate member.

9. A method according to claim 1, including attaching at least one weight to a first towline coupling a first vessel to the first end portion and a second towline coupling a second vessel to the second end portion.

10. A method according to claim 9, including damping the motion of the first and second tow vessels.

11. A method according to claim 9, including coupling buoyancy to each towline in the region of the at least one weight such that in the event of towline breakage, the buoyancy is arranged to float.

12. A method according to claim 9, including adjusting the depth at which the elongate member is transported by altering at least one of: the mass of the attached weights; the length of the towline(s); the buoyancy of the elongate member; and the tension applied during transportation of the towlines.

13. A method according to claim 1, including cladding at least a portion of an outer surface of the elongate member with a material that is both buoyant and insulating.

14. A method of towing an elongate member through water, the elongate member having two end portions, the method comprising the steps of:

provide a towline, a vessel and at least one weight;

adjusting the buoyancy of the elongate member by at least one method step selected from the group consisting of: filling and retaining a buoyant material within the elongate member; filling and retaining a buoyant fluid within the elongate member; and covering at least a portion of an outer surface of the elongate member with a buoyant material;

attaching the towline to the vessel;

coupling one of the end portions of the elongate member to the towline;

attaching at least one weight to the towline acting between the vessel and the end portion;

submerging the elongate member in water;

moving the vessels and towing the elongate member through water; and damping the movement of the vessel from the end portion of the elongate member by ensuring that the elongate member has a greater buoyancy than the at least one weight.

15. A method as claimed in claim 14, including providing a second vessel and a towline, attaching the second vessel to the other end portion of the elongate member and applying a back tension to the elongate member during towing.

16. A method as claimed in claim 15, including attaching at least one weight to the towline acting between the second vessel and the end portion and damping movement of the second vessel from the elongate member.

17. A method for transporting an elongate member through water, the elongate member having a first end portion and a second end portion, the method comprising the steps of:

adjusting the buoyancy of the elongate member to ensure that the elongate member is positively buoyant by cladding at least a portion of an outer surface of the elongate member with a material that is both buoyant and insulating;

providing at least one weight acting on each end portion of the elongate member; and transporting the elongate member through water in an inverted catenary configuration.

* * * * *